UNITED STATES PATENT OFFICE.

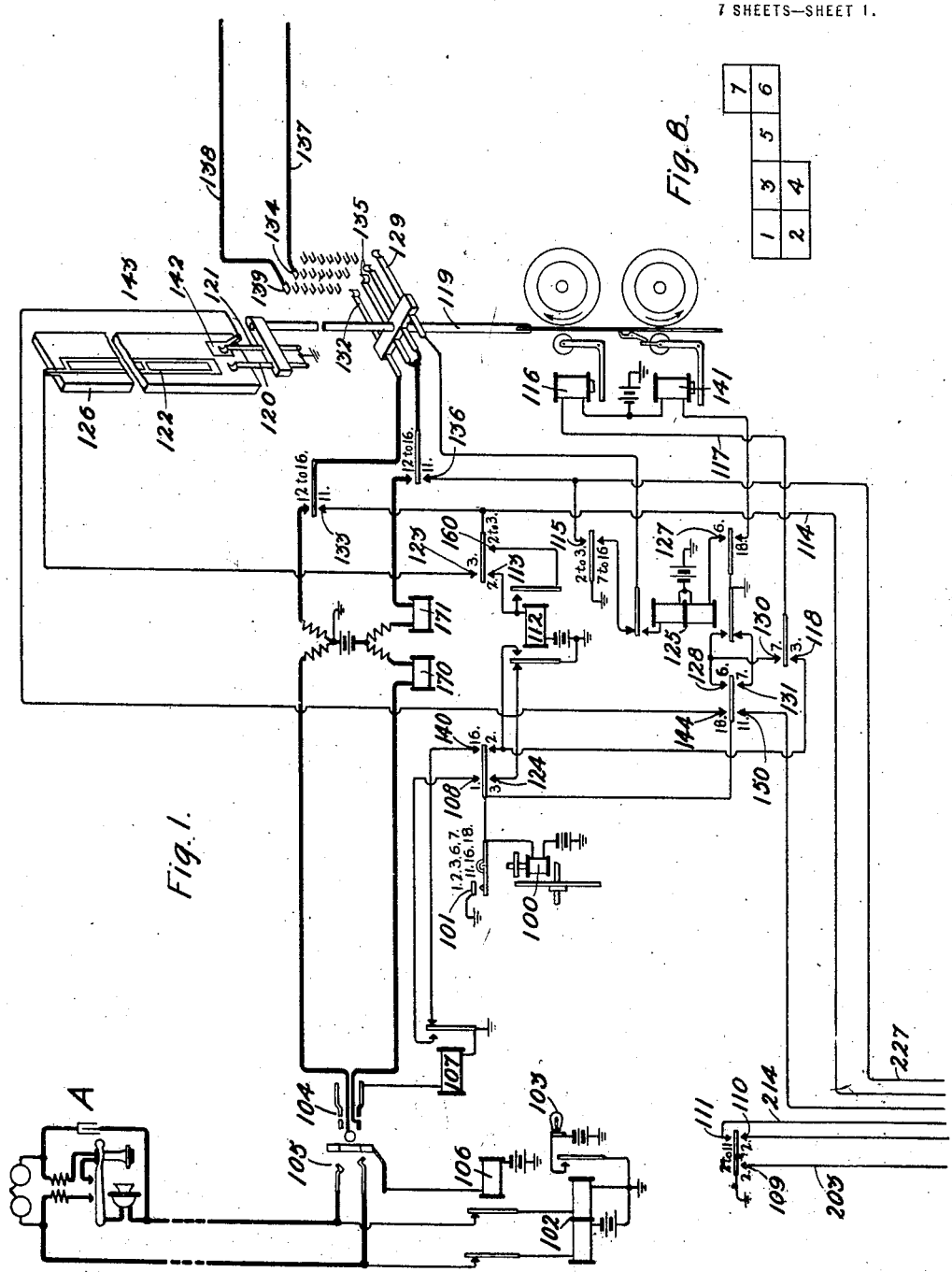

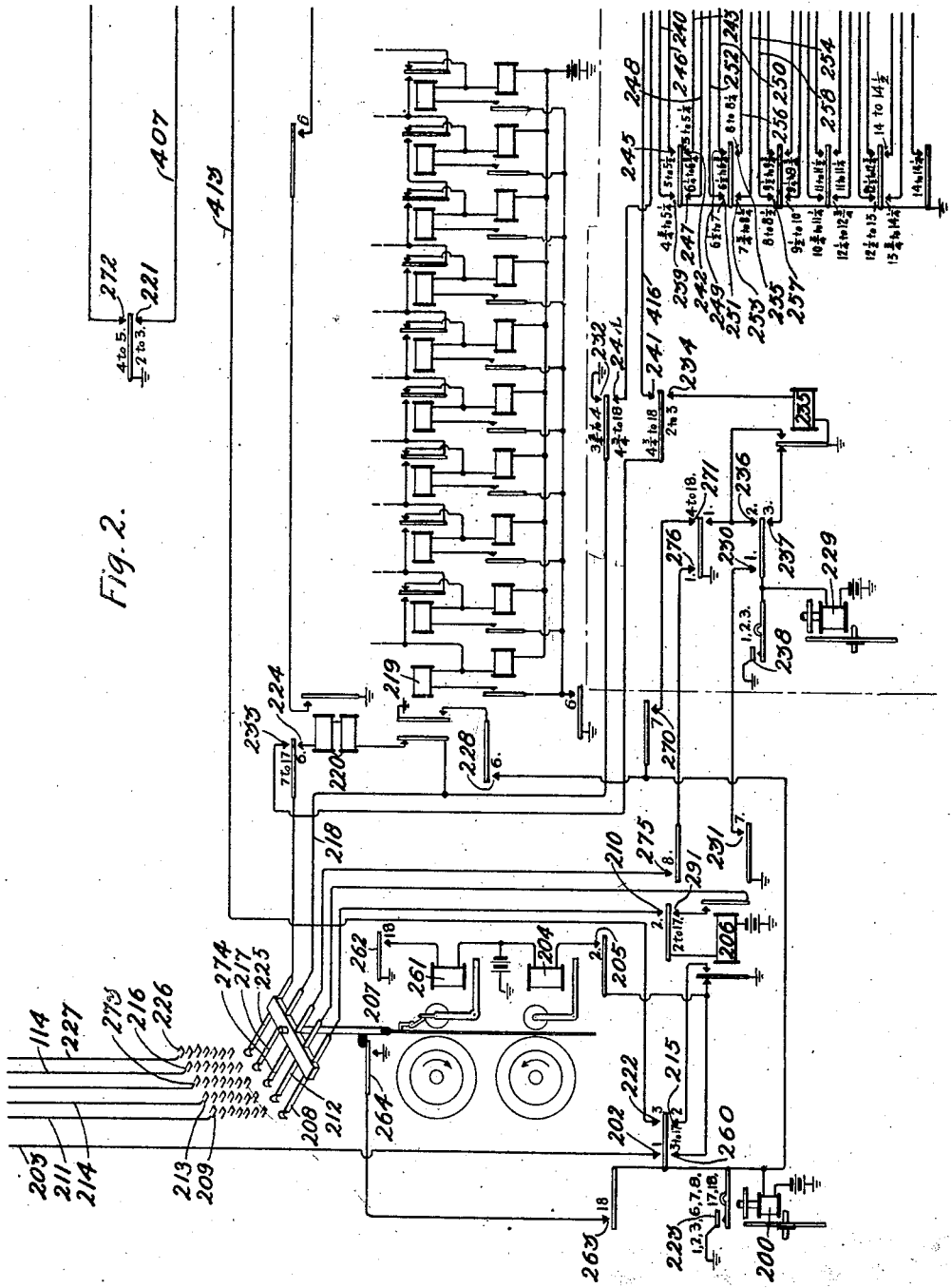

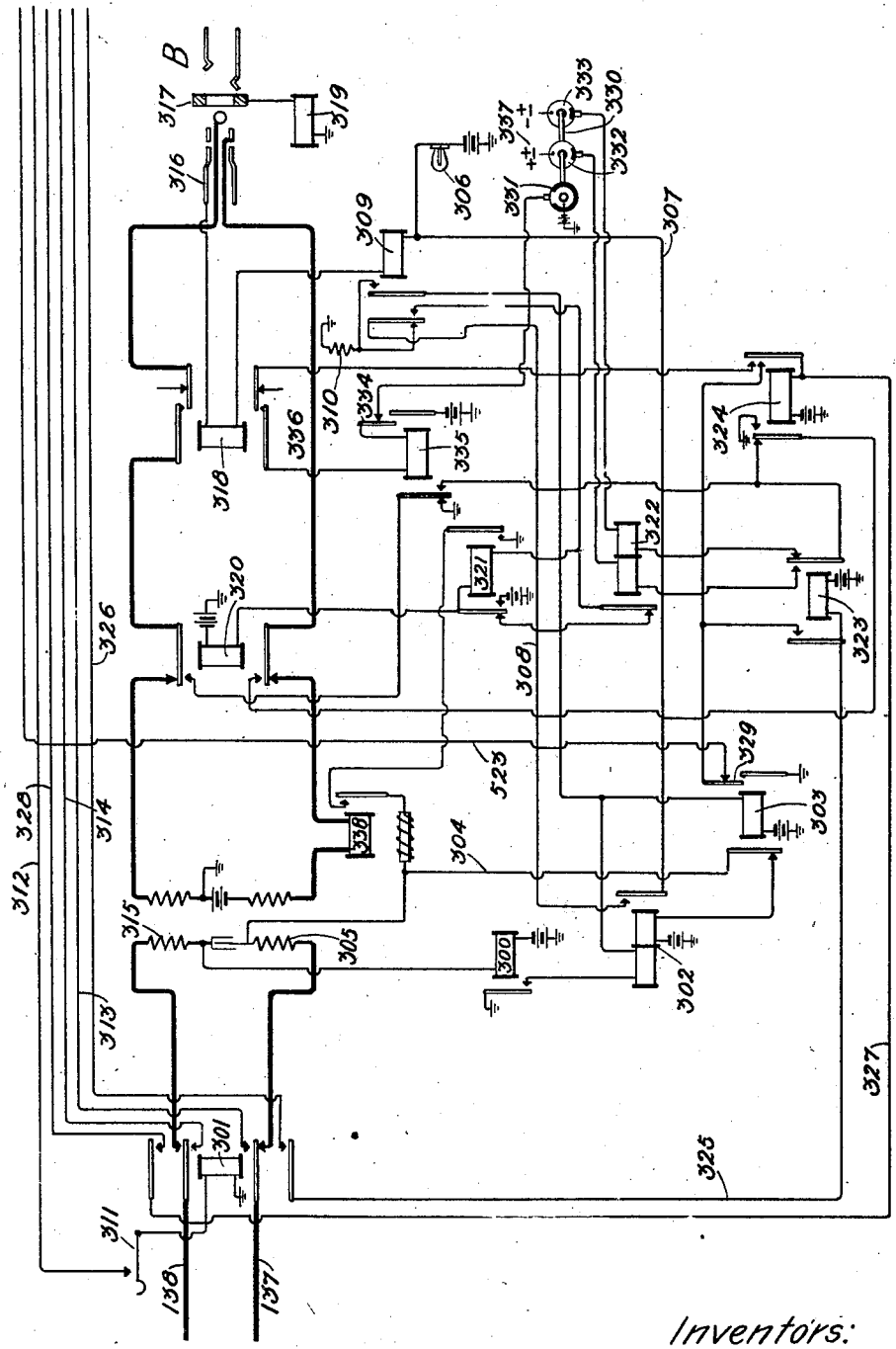

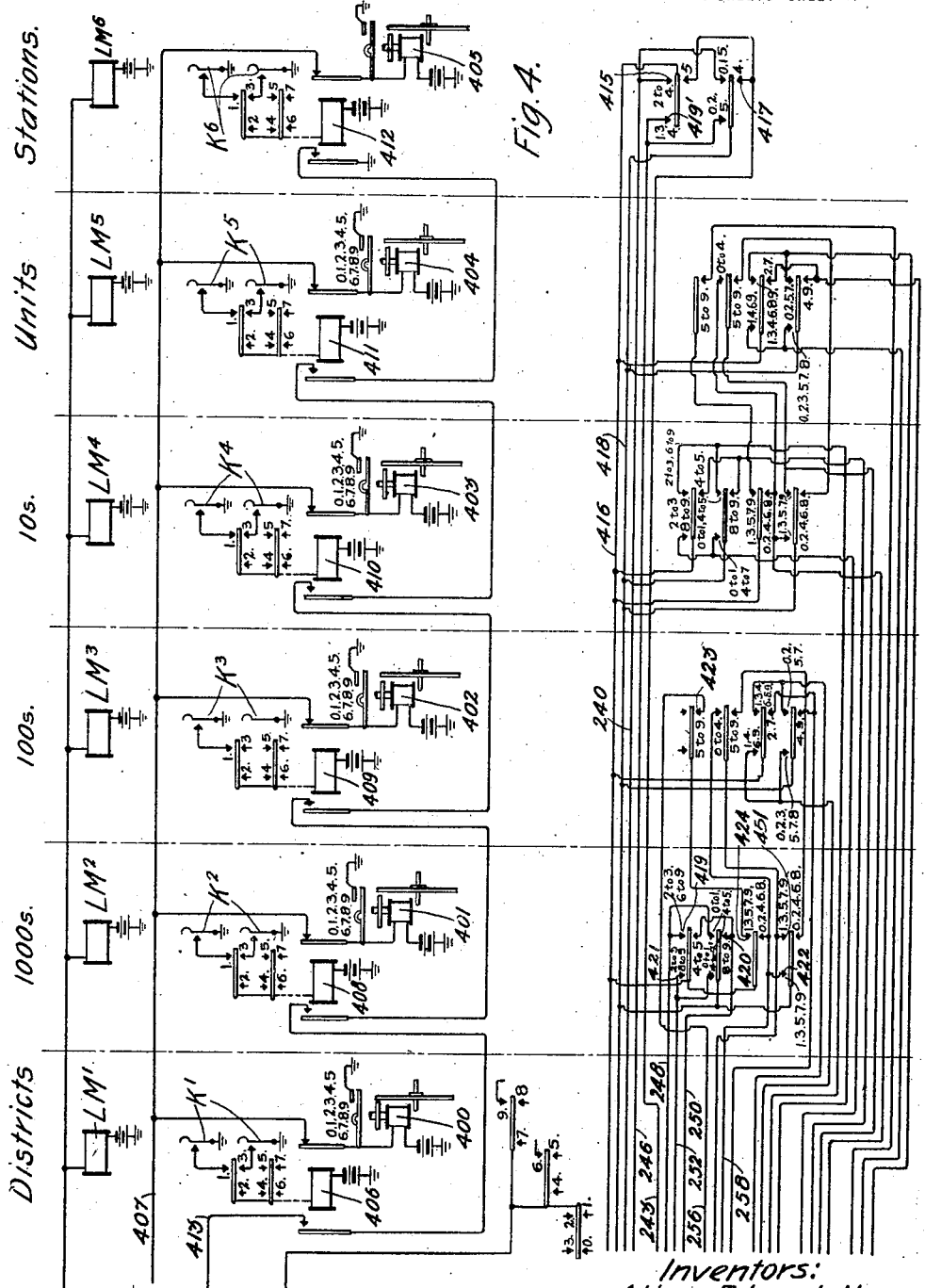

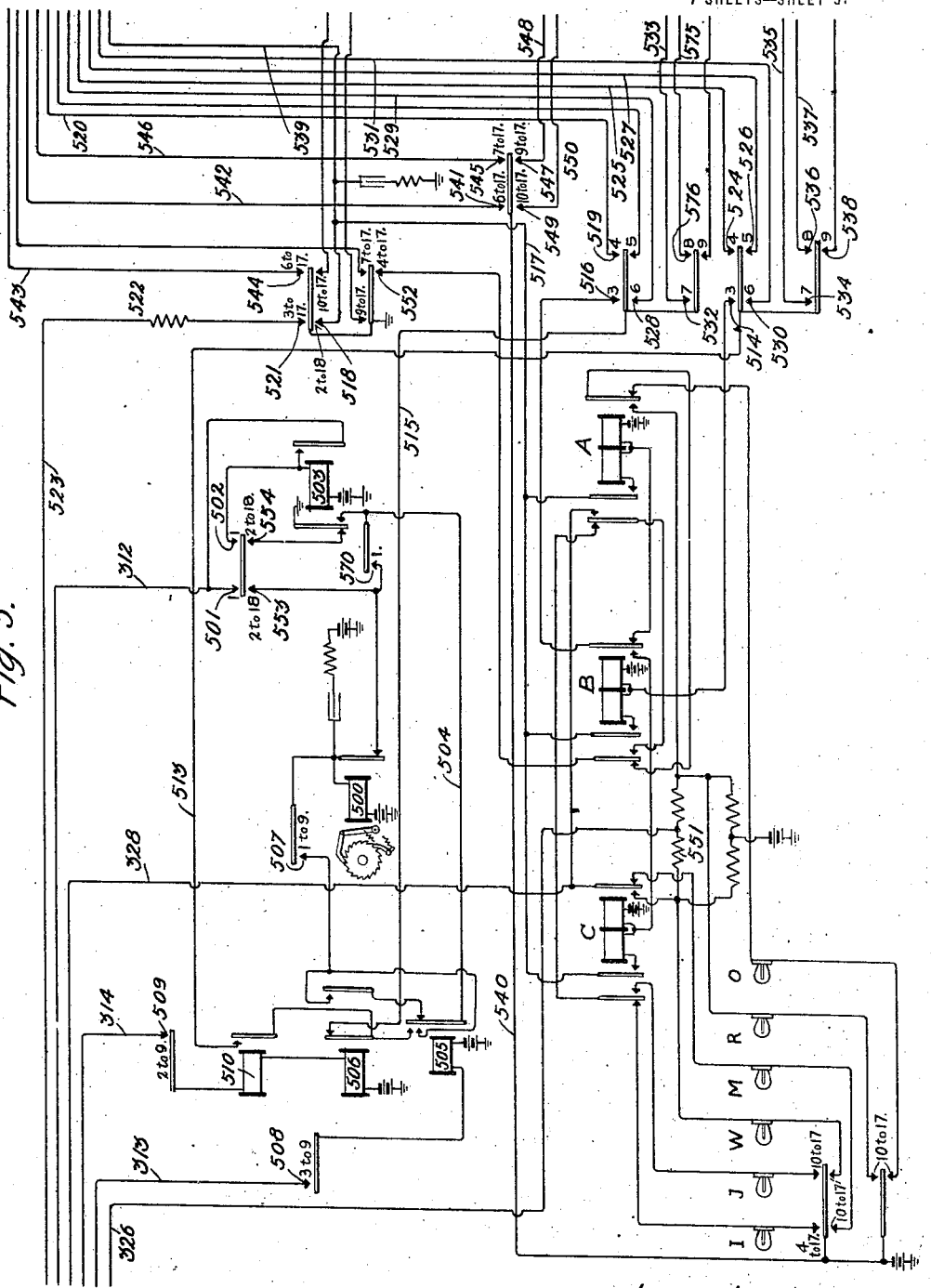

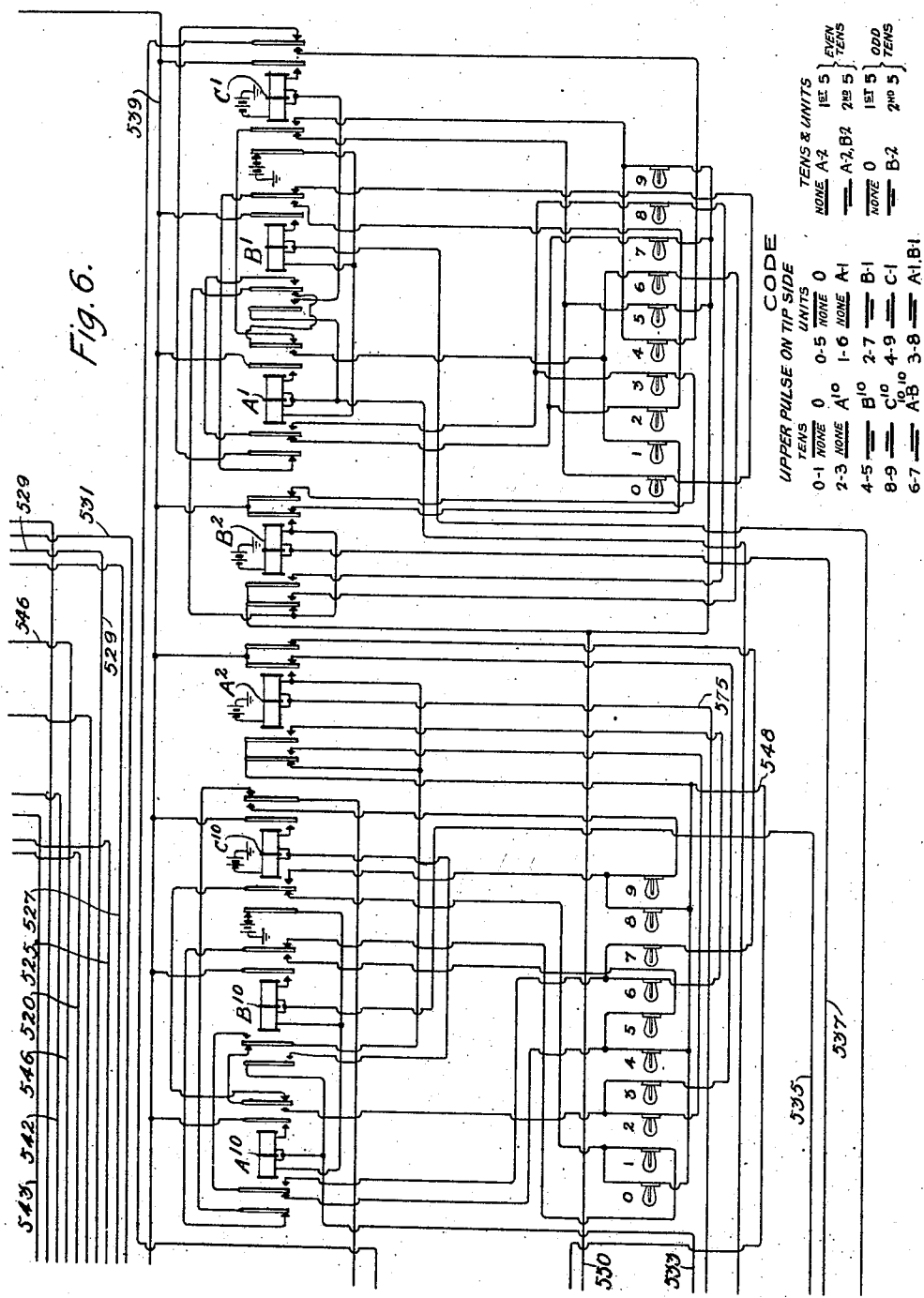

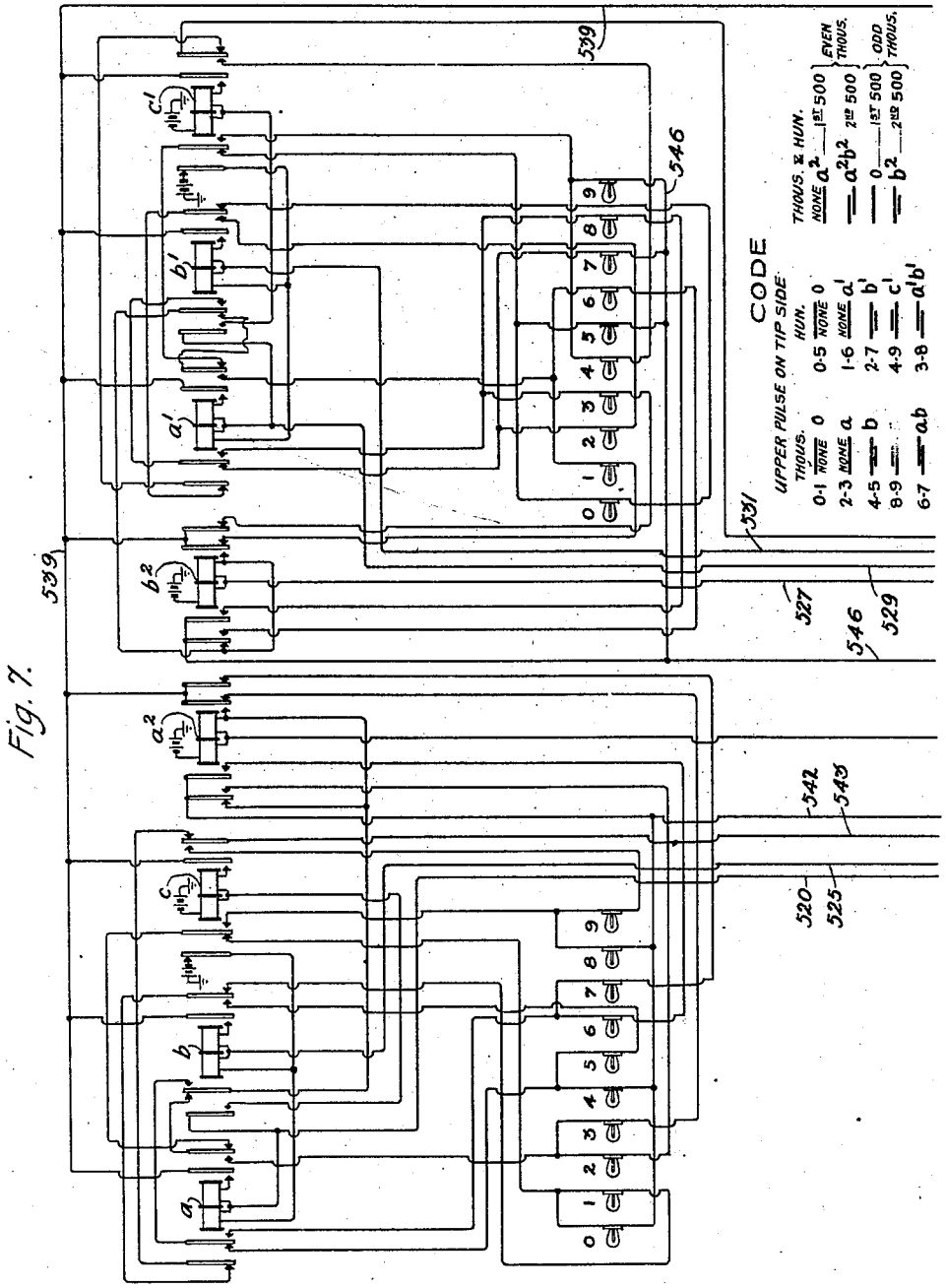

ALBEN E. LUNDELL AND EDGAR H. CLARK, OF NEW YORK, N. Y., ASSIGNORS TO WESTERN ELECTRIC COMPANY, INCORPORATED, OF NEW YORK, N. Y., A CORPORATION OF NEW YORK.

SIGNALING SYSTEM.

1,312,791.   Specification of Letters Patent.   Patented Aug. 12, 1919.

Application filed March 30, 1917. Serial No. 158,589.

*To all whom it may concern:*

Be it known that we, ALBEN E. LUNDELL and EDGAR H. CLARK, citizens of the United States, residing at New York, in the county of Bronx and State of New York, and at New York, in the county of New York and State of New York, respectively, have invented certain new and useful Improvements in Signaling Systems, of which the following is a full, clear, concise, and exact description.

This invention relates to signaling systems and more particularly to signaling systems employed in telephone systems.

It is the object of the present invention to provide means for selectively operating a plurality of signals in response to the operation of an impulse transmitting device which is arranged to transmit combinations of impulses varying in duration, order and number.

Another feature of this invention is the automatic selection of signaling current by means of impulses of various characteristics transmitted by a variably operated impulse transmitting device.

An additional feature of the invention is the employment of means for controlling the selection of ringing current and for operating a number indicating device in response to code impulses transmitted from a variably operated impulse device.

Other features of the invention not specifically referred to above will more clearly appear from the following description and claims.

Figures 1 to 7 of the drawings, when arranged in accordance with the chart indicated in Fig. 8, diagrammatically represent a portion of a telephone system employing the present invention.

In the system herein disclosed the apparatus associated with an A operator's position of a semi-automatic exchange and the apparatus associated with the B operator's position of a manual office are shown. It will be understood that only those parts are shown which are necessary for describing the establishment of a desired connection from a calling subscriber at A to the jack of a party line B.

In the present system the sequence switches, with the exception of sequence switch 500, are of the type disclosed in the patent to Reynolds and Baldwin 1,127,808, and are similar in operation and function to those disclosed in the patent to McBerty 1,125,579. The sequence switch 500 is referred to as a step-by-step sequence switch and is similar in structure to the above-mentioned switches except that it is driven by an impulse-controlled motor magnet instead of by a constantly driven power shaft. The switch 500 is advanced only upon the deënergization of its operating magnet, or, in other words, on the return stroke of its armature.

The selective switches of this system may be of the type disclosed in patent to Craft and Reynolds 1,123,696. The operating circuits for these switches are shown in the patent to Lundell 1,168,319.

In the present disclosure, registers, controlling devices and actuating relays are employed. The operation of these devices, except in so far as they are necessary for a clear understanding of this invention, has not been described. This operation is fully described in the above-mentioned patent to Lundell 1,168,319.

It is believed that the invention will best be understood by describing the manner of establishing a connection from the calling subscriber, whose substation is indicated at A, to the B operator, the method of indicating to the B operator the number of the desired line, and the method in which selective ringing current is applied to the called line.

When the calling subscriber removes his receiver from the switchhook, the line relay 102 is actuated in the well-known manner to light the lamp 103. The operator, on noting the lighting of lamp 103, inserts plug 104 in jack 105 of the calling line. A circuit is thereupon completed from grounded battery, winding of cut-off relay 106, sleeve of jack 105, sleeve of plug 104, winding of relay 107, to ground. The relays 106 and 107 are energized over this circuit. The cut-off relay 106 attracts its armatures to disconnect the line relay 102 from the calling line, and the line relay in turn extinguishes lamp 103. The relay 107 on attracting its armature, completes a circuit from ground, front contact and armature of relay 107, contact 108, magnet of sequence switch 100, to grounded battery, to move the sequence switch into position 2. As soon as the sequence switch 100 reaches position 2, a circuit is completed from grounded battery, magnet of sequence switch 200, contact 202, conductor 203, contact 109 to ground, to move the sequence switch 200 into position 2. In position 2 of sequence switch 200, an energizing circuit for the up-drive magnet 204 is closed from grounded battery, winding of the up-drive magnet 204, contact 205, left-hand back contact and armature of relay 206 to ground. The up-drive magnet 204 controls the elevation of the cord finder generally designated 207. As soon as the brush 208 of the cord finder 207 engages terminal 209 associated with the cord circuit which has been connected to the calling line, the relay 206 is energized over a circuit which may be traced from grounded battery, winding of relay 206, contact 210, brush 208, terminal 209, conductor 211, contact 110, to ground. Relay 206 attracts its armatures and at its left-hand armature interrupts the operating circuit of the up-drive magnet 204, which circuit was previously described and at the right-hand armature and front contact of relay 206 a locking circuit is established for this relay from grounded battery, winding of relay 206, contact 291, right-hand armature and front contact of relay 206, brush 212, terminal 213, conductor 214, contact 111, to ground, which maintains the relay 206 energized until the selector sequence switch 100 has moved out of position 11. At the left-hand armature and front contact of relay 206 a circuit is closed from ground, contact 215, magnet of sequence switch 200 to grounded battery, to move this sequence switch into position 3.

The operator thereupon places her headset (not shown) in telephonic communication with the substation apparatus and ascertains from the calling subscriber the number of the desired line. The operator then sets up this number on her key set, which is shown in Fig. 4 of the drawings. As soon as the operator has depressed the keys K¹, K², K³, K⁴, K⁵ and K⁶, operating circuits for the registers 400, 401, 402, 403, 404 and 405 are completed. These registers then rotate to positions indicated by the depressed keys of the key set. The operating circuit for the register 400 extends from grounded battery, magnet of the register 400, right-hand armature and back contact of stop relay 406, conductor 407, contact 221, to ground. The operating circuits for the registers 401, 402, 403, 404 and 405 are similarly traced through the right-hand armature and back contact of the stop relays 408, 409, 410, 411 and 412, respectively, conductor 407, to ground at contact 221. As soon as the stop relays 406, 408, 409, 410, 411 and 412 are energized, a circuit is completed from ground through the left-hand armature and front contacts of these relays, conductor 413, contact 222, magnet of sequence switch 200 to grounded battery, to move the sequence switch out of position 3.

Under the control of its master contact 223, sequence switch 200 rotates into position 6.

The fundamental circuit is now established from grounded battery, winding of the line relay 112, contact 113, conductor 114, terminal 216, brush 217, conductor 218, outer left-hand armature and back contact of the upper zero counting relay 219, winding of the stepping relay 220, contact 224, brush 225, terminal 226, conductor 227, contact 115 to ground. Relay 112 attracts its armature and thereby completes a locking circuit for itself. At the left-hand front contact and armature of relay 112 a circuit is also completed to move sequence switch 100 into position 3. With the sequence switch 100 in position 3 and with the line relay 112 energized, an operating circuit for the up-drive magnet 116 is completed from grounded battery, winding of magnet 116, conductor 117, contact 118, left-hand armature and front contact of relay 112 to ground. Under the control of the up-drive magnet, a selector switch, generally designated 119, elevates its brushes and also elevates its commutator brushes 120 and 121. Each time that the commutator brush 120 encounters a conducting segment 122 of commutator 126, a circuit in shunt of the fundamental circuit just described is completed from ground, commutator brush 120, conducting segment 122, contacts 123 and 160, right-hand armature and front contact of relay 112, winding of the line relay 112 to grounded battery, to short-circuit the stepping relay 220 in the well-known manner. This short-circuiting operation of the stepping relay continues until the upper zero counting relay 219 of the chain of relays, the length of which is determined by the setting of the district register 400, is actuated. When the relay 219 attracts its armatures, at its outer armature and back contact it interrupts the fundamental circuit above described, and at its inner armature and front contact completes a circuit from ground, contact 228, magnet of sequence switch 200, to grounded battery, to move the sequence switch out of position 6 into position 7.

When the fundamental circuit was interrupted at the upper zero counting relay 219, the line relay 112 deënergized and at its left-hand back contact and armature completed a circuit from ground, contact 124, magnet of sequence switch 100 to grounded battery, to move this sequence switch out of position 3. Under the control of its master contact 101, sequence switch 100 continues to rotate until it reaches position 6. In position 6 of the sequence switch 100, an energizing circuit for test relay 125 is closed from grounded battery, lower winding of relay 125, contact 127 to ground. The test relay 125 attracts its armatures and at its lower armature and front contact completes a circuit from ground through contact 128, magnet of sequence switch 100 to grounded battery, to move this sequence switch into position 7. In position 7 the test relay 125 is maintained energized over a circuit which may be traced from grounded battery, upper winding of the test relay, upper front contact and armature of relay 125, test brush 129 of the selector 119 to ground, over the test terminals of busy trunk lines. With the test relay 125 energized, an operating circuit for the up-drive magnet 116 is again completed from grounded battery, winding of the magnet 116, conductor 117, contact 130, lower front contact and armature of relay 125 to ground. As soon as the test brush 129 of the selector 119 encounters the test terminal of an idle line, which idle condition will be indicated by the absence of ground on the test terminal, the test relay 125 deënergizes and thereby completes a driving circuit for driving the sequence switch 100 out of position 7. This circuit may be traced from grounded battery, magnet of sequence switch 100, contact 131, lower back contact and armature of test relay 125, to ground. Under the control of its master contact, the sequence switch rotates until it reaches position 11.

In position 7 of sequence switch 200, an operating circuit for moving the sequence switch 229 out of position 1 is closed from grounded battery, magnet of sequence switch 229, contacts 230, 231, to ground.

With the sequence switch 100 in position 11 and the sequence switch 200 in position 7, a circuit is completed from grounded battery, right-hand winding of relay 302, left-hand armature and back contact of relay 303, conductor 304, repeating coil 305, lower inner armature and back contact of relay 301, ring conductor 137 of the trunk terminal 134, brush 135, contact 136, conductor 227, terminal 226, brush 225, contact 233, contact 234, winding of relay 235, to ground. The relays 235 and 302 are energized over this circuit and attract their armatures. At the front contact and armature of the relay 235 a circuit is completed from ground, contact 236, magnet of sequence switch 229 to grounded battery, to move the sequence switch 229 out of position 2 into position 3.

Upon the energization of the relay 302, a circuit is completed for lighting lamp 306 after the calling line has been extended to the operator's position. The actuating circuit of lamp 306 may be traced from grounded battery, conductor 307, armature and front contact of relay 302, conductor 308, outermost back contact and armature of relay 309, resistance 310 to ground. The operator, on noting the lighting of lamp 306, depresses the key 311, whereupon a circuit is completed from ground, winding of relay 301, key 311, conductor 312, contacts 501, 502, winding of relay 503, to grounded battery. The relays 503 and 301 are energized over this circuit and attract their armatures. The relay 503 at its right-hand armature and front contact completes a locking circuit for itself from grounded battery, winding and right-hand armature and front contact of relay 503, over the conductor 312 to ground, as previously described. At the left-hand armature and front contact of relay 503, a circuit is completed from ground, contacts 570, back contact, armature and winding of the magnet of the step-by-step sequence switch 500, to grounded battery. It will be remembered that this sequence switch is advanced only upon the deënergization of its magnet, or in other words, on the return stroke of its armature. The magnet attracts its armature which interrupts the operating circuit to move the sequence switch into position 2.

When relay 301 attracted its armature, the circuit of relay 235 (Fig. 2) was extended from the ring-conductor 137 to the conductor 313, but since this conductor was open at contact 508, relay 235 deënergizes to remove the sequence switch 229 out of position 3 through its various positions to normal.

When relay 301 attracted its armatures, a circuit was established from grounded battery, winding of the relays 506 and 510, contact 509, conductor 314, inner front contact and upper armature of relay 301, conductor 138, terminal 139, brush 132, contact 133, conductor 114, terminal 216, brush 217, conductor 218, contact 232, to ground. The relays 506 and 510 attract their armatures and relay 506 at its outer back contact and armature completes the energizing circuit of the magnet of sequence switch 500. However, the energizing circuit of relays 506 and 510 is almost immediately interrupted at contact 232, and these relays deënergize to move sequence switch 500 into position 3. Simultaneously with the energization of relay 301, the energizing circuit of relay 235 is interrupted and a circuit was completed from grounded battery, magnet of sequence switch 229, contact 237, back contact and armature of relay 235 to ground. The sequence switch 229 continues to rotate through its various positions and back to position 1 under the control of its master contact 238. When the sequence switch 229 reached position 4 a circuit was completed from grounded battery, magnet of sequence switch 200, contacts 270 and 271 to ground to move this sequence switch into position 8. While the sequence switch 229 is rotating through its various positions in proper sequence, it closes its contacts (shown at the right-hand corner of Fig. 2) to control the transmission of the impulses which cause the automatic selection of the proper ringing current of the desired subscriber on the party line, and also transmits impulses for actuating the proper group of relays which control the setting up of the desired subscriber's number. The character of these impulses is controlled by the length of closure of the contacts of sequence switch 229. Impulses of three different characters may be transmitted over the tip and ring conductors of the selected trunk. These impulses may be described as being long, short and medium in length. For convenience, the long impulse may be said to consist of early, middle and a late closure of the contacts leading to the tip or ring conductors. The short impulse may consist either of an early, middle or a late closure of these contacts; while the medium length impulse may consist of an early and a middle closure, or a middle and a late closure of these contacts. For convenience in describing the selection of ringing current, for the actuation of the relays which control the setting up of the desired subscriber's number, the terms "early", "middle", and "late" will be used to describe the character of the impulse employed in these operations.

Let it be assumed that the desired subscriber's number is 9987-W. Under this assumption the operator in setting up the number on the keyboard has caused the thousands register 401 to stop in position 9, the hundreds register 402 in position 9, the tens register 403 in position 8, the units register 404 in position 7 and the stations register 405 in position 4. In order to select the proper ringing current for ringing party W, it is necessary to lock up the relays A, B and C of Fig. 5. To acomplish this, it is necessary to transmit the following code impulses: a middle impulse on the tip conductor, and early, middle and late impulses on the ring conductor. With this setting of the station's register 405 while the sequence switch 229 is rotating through positions 4-3/4 to 5-1/4, a circuit is completed from ground, contact 239, conductor 240, contact 415, conductor 416, contacts 241, 233, brush 225, terminal 226, conductor 227, contact 136, brush 135, terminal 134, ring conductor 137, lower inner armature and front contact of relay 301, conductor 313, contact 508, winding of relay 505, to grounded battery. While the sequence switch 229 is rotating through position 5 to 5-1/4, a circuit is closed from ground, contact 242, conductor 243, contact 417, conductor 418, contact 244, conductor 218, brush 217, terminal 216, conductor 114, contact 133, brush 132, terminal 139, tip conductor 138, upper inner armature and front contact of relay 301, conductor 314, contact 509, windings of relays 510 and 506, to grounded battery. While the sequence switch 229 is passing through position 5 to 5-1/2, a circuit is closed from ground, contact 245, conductor 246, contact 419, conductor 416, over the circuit previously traced through the winding of relay 505 to grounded battery. It will thus be seen that a middle impulse has been transmitted over the tip conductor, and that an early and a late impulse have been transmitted over the ring conductor. As was explained in connection with the structure of the sequence switch 229, the contacts of the sequence switch are closed in positions indicated by the small numeral adjacent thereto. From this it will be understood that while the sequence switch 229 is rotating through positions 4-3/4 to 5-1/2, there is an interval in which the contacts 239 and 242 are simultaneously closed. It will be remembered that for selecting ringing current for station W that a middle impulse is transmitted over the tip conductor of the trunk, and that an early, middle and late impulse are transmitted over the ring conductor of this trunk. Since the impulse over the tip conductor is a middle impulse, there will be a time when the relay 505 and the relays 506 and 510 will be simultaneously energized. Under these conditions a circuit will be completed from ground, left-hand armature and front contact of relay 503, conductor 504, armature and front contact of relay 505, inner right-hand armature and back contact of relay 506, conductor 515, contact 516, right-hand armature and back contact of relay B, right-hand winding of relay A to grounded battery. The relay A attracts its armatures. In response to "middle" impulses over the tip and ring conductors, relays 505, 506 and 510 are simultaneously energized, as a result of which a circuit will be completed from ground, left-hand armature and front contact of relay 503, conductor 504, armature and front contact of relay 505, armature and front contact of relay 510, conductor 513, contact 514, right-hand winding of relay B to grounded battery. The relay B is energized in this circuit and attracts its armatures.

With the relays A and B energized, an energizing circuit is completed for the relay C, which extends from grounded battery, right-hand winding of the relay C, right-hand front contact and armature of relay B, contact 516, conductor 515, inner back contact and armature of relay 506, front contact and armature of relay 505, conductor 504, left-hand front contact and armature of relay 503 to ground. The relays A, B and C, as soon as they attract their left-hand armatures, complete locking circuits for themselves. The locking circuit for the relay A may be traced from grounded battery, both windings of the relay A in series, inner left-hand contact and armature, conductor 517, contact 518, to ground. The locking circuits of the relays B and C may be similarly traced. When relays 505 and 506 deënergize, the sequence switch 500 moves into position 4.

In position 4 the impulses for controlling the selection of the thousands digit are transmitted. It will be remembered that the thousands digit is 9. For selecting the lamp corresponding to the digit 9, it is necessary to transmit a middle impulse over the tip conductor, and an early and a late impulse over the ring conductor of the trunk employed.

While the sequence switch 229 was rotating through positions 6-1/4 to 6-3/4, the following impulses were transmitted: from ground, contact 247, conductor 248, contact 419, conductor 416, over the circuit previously traced, through the ring conductor 137, the winding of relay 505, to grounded battery. In position 6-1/2 to 6-3/4, a circuit is completed from ground, contact 249, conductor 250, contact 420, conductor 418, over the tip conductor 138, through the windings of the relays 506 and 510, to grounded battery. In position 6-1/2 to 7 of the sequence switch 229, a circuit is completed from ground through contact 251, conductor 252, contact 421, conductor 416, over the ring conductor through the windings of the relay 505 to grounded battery. Under these conditions the relay 505 is energized, and the relays 506 and 510 are deenergized, and a circuit is completed from ground, left-hand armature and front contact of relay 503, conductor 504, armature and front contact of relay 505, conductor 515, contact 519, conductor 520, left-hand winding of the relay $a$, outer left-hand armature and back contact of relay $c$ to grounded battery. Relay $a$ is energized in this circuit and establishes a locking circuit for itself which may be traced from grounded battery, outer left-hand contact and armature of relay $c$, both windings of the relay $a$ in series, right-hand inner front contact and armature of the relay $a$, conductor 539, contact 518, to ground. While the middle impulse is being transmitted the relays 505, 506 and 510 are energized, resulting in an energizing circuit from ground, left-hand armature and front contact of relay 503, conductor 504, armature and front contact of relay 505, armature and front contact of relay 510, conductor 513, contact 524, conductor 525, left-hand winding of the relay $b$, outer left-hand armature and back contact of relay $c$, to grounded battery. The relay $b$ attracts its armatures and completes a locking circuit for itself from grounded battery, outer left-hand armature and back contact of the relay $c$, both windings of the relay $b$ in series, right-hand inner upper contact and armature of relay $b$, to ground over conductor 539 as previously described. In response to the "late" impulse only the relay 505 is energized. As a result of this a circuit is completed from ground, left-hand armature and front contact of relay 503, conductor 504, armature and front contact of relay 505, inner armature and back contact of relay 506, conductor 515, contact 519, conductor 520, outer left-hand armature and front contact of relay $b$, left-hand winding of relay $c$, to grounded battery. The relay attracts its armatures, thereby establishing a locking circuit for itself and also interrupting the circuits of relays $a$ and $b$. These impulses have been sufficient to select the lamps 8 and 9. It is now necessary to transmit impulses to select the lamp 9. On noting the code impulses, it will be seen that since the number 9 is an odd number and occurs in the second five hundred of the odd thousands, that an "early," "middle" and "late" impulse are transmitted over the tip conductor, and that a "middle" impulse is transmitted over the ring conductor of the selected trunk. These impulses are transmitted in accordance with the translation which takes place in the registers, as will be indicated by tracing the following circuits. While the sequence switch 229 is rotating through positions 7-3/4 to 8-1/4, the following impulses are sent: from ground, contact 253, conductor 254, contact 451, conductor 418, over the tip conductor, through the windings of relays 510 and 506 to grounded battery. While the sequence switch 229 was rotating through position 8 to 8-1/4, a circuit was closed from ground through contact 255, conductor 256, contacts 423, 424, conductor 416 over the ring conductor, winding of relay 505, to grounded battery; and while the sequence switch 229 is rotating through position 8 to 8-1/2, a circuit is closed from ground, contact 257, conductor 258, contact 422, conductor 418 over the tip conductor, windings of relays 510 and 506, to ground. In response to the "early" impulses, the relays 506 and 510 are energized, but the relay 505 is deënergized. Therefore no energizing circuit is completed for the relays controlling the thousands indication. In response to the middle impulses, the relays 505, 506 and 510 are energized, as a result of which circuit is completed from ground, left-hand armature and front contact of relay 503, conductor 504, right-hand armature and front contact of relay 505, armature and front contact of relay 510, conductor 513, contact 526, conductor 527, winding of the relay $b^2$ to grounded battery. The relay $b^2$ attracts its armatures and completes a locking circuit for itself from grounded battery, both windings of the relay $b^2$ in series, inner right-hand front contact and armature of the relay $b^2$, to ground over conductor 539, as previously described. In response to the late impulse, only the relays 506 and 510 are energized. For this reason no further energizing circuit is completed for the thousands controlling relays of Fig. 7.

At the close of this last group of impulses, the relays 505 and 506 deënergize, as a result of which the energizing circuit of the magnet of sequence switch 500 is interrupted. This causes the sequence switch to move into position 6, in which the impulses for actuating the relays controlling the selection of the hundreds lamp are transmitted. It will be remembered that the hundreds digit in the case assumed was 9. For selecting the No. 9 lamp, it is necessary to transmit a middle impulse over the tip conductor, and an early, middle and late impulse over the ring conductor of the trunk selector. It is not believed necessary to trace the circuits over which these impulses are transmitted through the contacts of the sequence switch 229. It will be assumed that these various impulses are transmitted to actuate the relays 505, 506 and 510 in the proper combination. Since an early impulse is first transmitted over the ring conductor, only the relay 505 will be energized, as a result of which an energizing circuit is completed from ground, left-hand front contact and armature of relay 503, conductor 504, armature and front contact of relay 505, inner armature and back contact of relay 506, conductor 515, contact 528, conductor 529, left-hand winding of relay $a'$, outer left-hand armature and back contact of relay $c'$, to grounded battery. A middle impulse is transmitted over both the tip and ring conductors, as a result of which the relays 505, 506 and 510 are energized. This completed a circuit from ground, left-hand armature and front contact of relay 503, conductor 504, armature and front contact of relay 505, armature and front contact of relay 510, conductor 513, contact 530, conductor 531, left-hand winding of relay $b'$, outer left-hand armature and back contact of relay $c'$ to grounded battery. In the transmission of the late impulses, only a late impulse is transmitted over the ring conductor, thus only the relay 505 is energized. An energizing circuit is now closed from ground, left-hand armature and front contact of relay 503, conductor 504, armature and front contact of relay 505, inner armature and back contact of relay 506, conductor 515, contact 528, conductor 529, outer left-hand armature and front contact of relay $b'$, left-hand winding of relay $c'$, to grounded battery. The relay $c'$ is energized in this circuit and attracts its armatures, and at its outer left-hand back contact and armature interrupts the energizing circuits of the relays $a'$ and $b'$. When the relays 505, 506, 510 deënergize, sequence switch 500 moves into position 7.

The tens digit for the case assumed is 8. For the selection of the No. 8 tens lamp, a middle impulse is transmitted over the tip conductor and an early, middle and late impulse over the ring conductor of the selected trunk. Since an early impulse is transmitted over the ring conductor and no early impulse is transmitted over the tip conductor, relay 505 is energized and the relays 506 and 510 remain deënergized. This completes a circuit from ground, through the left-hand armature and front contact of relay 503, conductor 504, armature and front contact of relay 505, inner armature and back contact of relay 506, conductor 515, contact 532, conductor 533, left-hand winding of relay $A^{10}$, outer left-hand armature and back contact of the relay $C^{10}$, to grounded battery. The middle impulses are transmitted over the tip and ring conductors to energize the relays 505, 506 and 510. This closes a circuit from ground, left-hand armature and front contact of relay 503, conductor 504, armature and front contact of relay 505, armature and front contact of relay 510, conductor 513, contact 534, conductor 535, left-hand winding of relay $B^{10}$, outer left-hand armature and back contact of relay $C^{10}$ to grounded battery. A late impulse is now transmitted over the ring conductor, but no late impulse is transmitted over the tip conductor of the selected trunk. Relay 505 is energized, but relays 506 and 510 are deënergized. This completes a circuit from ground, left-hand armature and front contact of relay 503, conductor 504, armature and front contact of relay 505, inner armature and back contact of relay 506, conductor 515, contact 532, conductor 533, outer left-hand armature and front contact of relay $B^{10}$, left-hand winding of relay $C^{10}$, to grounded battery. The relay $C^{10}$ attracts its armatures and at its outer left-hand armature and back contact interrupts an energizing circuit of the relays $A^{10}$ and $B^{10}$. The last mentioned impulses are sufficient to select the lamps 8 and 9. At the closure of the series of impulses the relays 505, 506 and 510 deënergize to cause sequence switch 500 to move into position 8.

It is now necessary to transmit impulses to select the No. 8 tens lamp. Since the numeral 8 is in the second group of five of the even tens, it is necessary to transmit an early and a middle impulse over the tip conductor and a middle and late impulse over the ring conductor. Since no early impulse is transmitted over the ring conductor, the relay 505 is not energized, and no circuit is completed to actuate the relays controlling the selection of a tens lamp. In response to the middle impulses, the relays 505, 506 and 510 are again energized. This prepares an energizing circuit from ground, left-hand armature and front contact of relay 503, conductor 504, armature and front contact of relay 505, armature and front contact of relay 510, conductor 513, contact 536, conductor 537, left-hand winding of relay $B^2$, to grounded battery. In response to the late impulses, relay 505 is energized, and relay $A^2$ is energized over a circuit from grounded battery, conductor 575, contact 576, conductor 515, inner armature and back contact of relay 506, front contact and armature of relay 505 to ground. At the close of this series of impulses, the relays 505, 506 and 510 have their armatures retracted and interrupt the operating circuit of the magnet of sequence switch 500 to move the sequence switch into position 9. In position 9 the impulses controlling the selection of the units lamp are transmitted. In the case assumed, the units digit is No. 7, and an early, middle and late impulse are transmitted over the tip conductor, and the middle impulse is transmitted over the ring conductor. Since no early or late impulses are transmitted over the ring conductor, the relay 505 is not energized and completes no energizing circuit for operating the relays controlling the lighting of the units lamp. However, middle impulses are transmitted over the tip and ring conductors to energize the relays 505, 506 and 510. Under these conditions a circuit is closed from ground, left-hand armature and front contact of relay 503, conductor 504, armature and front contact of relay 505, armature and front contact of relay 510, conductor 513, contact 538, left-hand winding of the relay B', outer left-hand armature and back contact of the relay C', to grounded battery. At the close of this series of impulses, the relays 505, 506 and 510 are deënergized. As a result of this, the energizing circuit of the magnet of the sequence switch 500 is interrupted, causing this sequence switch to move into position 10. A circuit for lighting the No. 9 thousands lamp may be traced from grounded battery, at the lower left-hand corner of Fig. 5, conductor 540, contact 541, conductor 542, outer left-hand armature and back contact of relay $a^2$, inner left-hand armature and back contact of relay $b$, outer right-hand armature and back contact of relay $a$, inner left-hand armature and front contact of relay $c$, through the No. 9 lamp, outer right-hand front contact and armature of relay $c$, conductor 543, contact 544, to ground. The circuit for the No. 9 hundreds lamp is completed from grounded battery, conductor 540, contact 545, conductor 546, through the No. 9 lamp, inner left-hand front contact and armature of relay $c'$ outer right-hand back contact and armature of relay $a'$, inner left-hand back contact and armature of the relay $b'$, inner right-hand front contact and armature of the relay $b^2$, which is now energized, conductor 539, contact 518, to ground. While the sequence switch 500 is rotating through positions 9 and 10, the hundreds and units lamps are lighted. It will be remembered that the following relays of Fig. 6 have been actuated and locked up: relays $C^{10}$, $A^2$, $B^2$ and B'. With these relays actuated, a circuit is closed from battery, conductor 540, contact 547, conductor 548, through lamp 8, inner left-hand front contact and armature of relay $C^{10}$, outer right-hand back contact and armature of relay $A^{10}$, inner left-hand back contact and armature of relay $B^{10}$, inner right-hand front contact and armature of relay $A^2$, conductor 539, contact 518 to ground. In position 10 of the sequence switch 500, a circuit is completed from grounded battery, conductor 540, contact 549, conductor 550, lamp 7, inner left-hand armature and back contact of relay A', inner left-hand armature and front contact of relay B', inner right-hand front contact and armature of relay $B^2$, conductor 539, contact 518, to ground.

It should here be noted that as soon as sequence switch 229 rotates through its various positions to position 1, a circuit is completed from grounded battery, magnet of sequence switch 100, contact 150, terminal 273, brush 274, contacts 275 and 276 to ground, to move this sequence switch into position 16.

As soon as the sequence switch 100 moves out of position 11, the locking circuit for the relay 206 is interrupted. Relay 206 deënergizes and completes a circuit for moving the sequence switch 200 out of position 8 and into position 18. This circuit may be traced from grounded battery, magnet of sequence switch 200, contact 260, left-hand back contact and armature of relay 206, to ground. In position 18 a circuit is completed for the down-drive magnet 261, which is established from grounded battery, winding of the down-drive magnet 261, contact 262, to ground. Under the control of the down-drive magnet, the cord finder switch is restored to its normal position, in which normal position a circuit is completed from grounded battery, magnet of sequence switch 200, contact 263, normal contact 264, to ground, to move the sequence switch into position 1.

The operator, on noticing the number of the desired line set up on the call indicating lamps, inserts a plug 316 into the jack 317 of the party line over which the desired subscriber can be reached and releases key 311. The release of this key causes the restoration of the number indicating apparatus and causes the deënergization of relay 301. Relays 300 and 302 become energized and attract their armatures. As soon as the plug 316 is inserted into the jack 317, a circuit is completed from grounded battery, through the lamp 306, winding of the relays 309, 318, sleeve of plug 316, sleeve of jack 317, winding of relay 319, to ground. The relays 309 and 318 attract their armatures. As soon as the relay 309 attracts its armatures, a circuit is prepared for the relay 320, which extends from grounded battery, winding of the relay 320, armature and back contact of relay 321, back contact and armature of relay 322, outer left-hand front contact and armature of relay 309, conductor 308, armature and contact of relay 302 to ground through relays 309, 318 and 319. The relay 320 is energized in this circuit and attracts its armatures. The circuit completed through relay 320, shunts and extinguishes the lamp 306. Simultaneously with the energization of relay 320, the relay 303 is actuated over a circuit traceable from grounded battery, winding of relay 303, inner armature and front contact of relay 309, resistance 310, to ground. The relay 303 attracts its armatures. The relay 323, it will be remembered, was energized over a circuit closed from grounded battery, winding of relay 323, conductor 325, the lower armature and front contact of relay 301, conductor 326, resistance 551, right-hand front contact and armature of relay C, outer left-hand front contact and armature of relay A, outer left-hand front contact and armature of relay B, contact 552, to ground. The relay 324 is energized over a circuit completed from grounded battery, winding of relay 324, conductor 327, outer upper armature and front contact of relay 301, conductor 328, outer left-hand front contact and armature of relay A, outer left-hand front contact and armature of relay B, contact 552, to ground. These relays, as soon as they were energized, were locked up through contact spring 329, conductor 523, resistance 522, contact 521 to ground. As soon as the relay 303 attracted its armatures the following locking circuits were substituted for those previously traced for the relays 323 and 324. The locking circuit of relay 323 is traceable from grounded battery, winding of relay 323, left-hand armature and front contact of this relay, contact spring 329, right-hand armature and front contact of relay 303, to ground. The locking circuit of the relay 324 extends from grounded battery, winding of relay 324, right-hand armature and front contact of relay 324, contact spring 329, armature of the relay 303, to ground.

In order to prevent ringing of the substation set of a subscriber other than the desired party when the plug 316 is being inserted into jack 317, an interrupting device 330 is provided. This interrupter is of the well-known type which consists of a constantly rotating shaft on which there are secured the disks 331, 332 and 333. The disks 332 and 333 are insulated from the shaft on which they are secured and are provided with brushes which engage their peripheries. The periphery of the disk 331, with the exception of a very small portion, is covered with an insulating material. The conducting portion is so positioned with respect to the conducting portions of the disks 332 and 333 that while a circuit is completed through the disk 331, no circuit is completed through the disks 332 and 333. The purpose of this adjustment will be hereinafter described.

After the insertion of the plug 316 into the jack 317 and after the energization of the relay 318, as soon as the brush of the disk 331 encounters its conducting segment, a circuit is completed from grounded battery through the disk 331 and its brush, through the contact and contact spring 334, through the winding of the relay 335, lower armature of the relay 318, contact spring 336, right-hand contact and armature of relay 324, to ground at contact spring 329 and armature of relay 303. The relay 335 attracts its armature and completes a circuit from grounded battery through the contact spring 334, over the circuit just described. When now the brush of the disk 332 encounters its conducting segment, a circuit is completed from the positive source of ringing current 337, conducting portion and brush of disk 332, left-hand winding of the relay 322, right-hand front contact and armature of relay 323, left-hand front contact and armature of relay 335, upper front contact and armature of relay 320, upper armature and upper contact of relay 318, tip of plug 316, tip of jack 317, through the substation apparatus of the desired subscriber, ring of the jack, ring of the plug, lower armature and front contact of the relay 320, left-hand armature and front contact of relay 324 to ground.

The relay 322 is marginal and does not attract its armatures until the called subscriber has answered. When the relay 322 is energized, the relay 321, which was shunted, attracts its armature and completes a circuit from grounded battery, armature and front contact and winding of the relay 321, outer left-hand front contact and armature of relay 309, armature and front contact of relay 302, windings of the relays 309, 318 and 319, to ground. The relay 321 locks itself up in this circuit and prevents the reapplication of ringing current during this call. When the A operator restores the selector switch 119 on noting that the calling party has terminated the conversation, supervisory lamp 306 operates in the well-known manner to inform the B operator that the call has terminated, whereupon she removes plug 316 from jack 317 to deënergize the relays 309, 318 and 319. The relay 309, in deënergizing, causes the deënergization of relay 303, and this relay interrupts the locking circuit of the relays 323, 324 and 335. Relay 338 prevents a second series of impulses from actuating the call indicating apparatus until the B operator has removed the plug 316 from the jack 317.

When the B operator released key 311 the relays 301 and 503 deënergized. Relay 301, on retracting its armatures, extends the trunk conductors 137 and 138 to the called substation. Relay 503 on retracting its armatures completes an interrupting circuit for moving its sequence switch 500 to position 1. This is completed from grounded battery, winding of the magnet of the step-by-step sequence switch 500, armature and back contact of this magnet, contacts 553 and 554, left-hand back contact and armature of relay 503, to ground. As soon as the sequence switch 500 has moved out of position 18, the actuated relays of Figs. 6 and 7 are released and the lamps controlled by these relays are extinguished. The relays A, B and C are also released at this time and the lamp W, which was lighted as a result of the actuation of these relays, is extinguished. At the termination of the conversation the actuation of the supervisory relays 170 and 171 operates in the well-known manner to inform the A operator that the call has terminated. She thereupon removes the plug 104 from the jack 105, which causes the relays 106 and 107 to retract their armatures. This completes a circuit for moving the sequence switch 100 out of position 16 and into position 18. This circuit may be traced from grounded battery, winding of magnet of sequence switch 100, contact 140, armature and back contact of relay 107. In position 18 the down-drive magnet 141 is operated in the well-known manner to restore the selector switch 119 to its normal position. When the switch is restored, a circuit is completed from ground, commutator brush 121, segment 142, contact 144, magnet of sequence switch 100, to grounded battery to move this sequence switch into its normal position.

What is claimed is:

1. In a telephone system, an incoming line, outgoing lines, a plurality of substations connected to said outgoing lines, a signal associated with each of said substations, an automatic switch for interconnecting said incoming line and said outgoing lines, means for directively operating said switch, an impulse transmitting mechanism arranged to transmit impulses of various characteristics, sources of signaling current of various characteristics for operating said signals, and mechanism responsive to said impulse transmitting device for selecting the desired source of signaling current.

2. In a telephone system, an incoming line, outgoing lines, a plurality of substations connected to said outgoing lines, a signal associated with each of said substations, an automatic switch for interconnecting said incoming line and said outgoing lines, means for operating said switch, a directively operated impulse transmitting device arranged to transmit impulses of various characteristics, sources of signaling current, and mechanism responsive to impulses from said impulse transmitting device for applying proper signaling current to actuate the signal at the desired substation.

3. In a telephone system, an incoming line, outgoing lines, a plurality of substations connected to said outgoing lines, a signal associated with each of said substations, an automatic switch for interconnecting said incoming line and said outgoing lines, means for operating said switch, an impulse transmitting device arranged to be connected to said incoming line and to transmit impulses of various characteristics thereover, sources of signaling current of varying characteristics, mechanism responsive to impulses from said impulse transmitting device for selecting the desired signaling current.

4. In a telephone system, an incoming line, outgoing lines, a plurality of substations connected to said outgoing lines, a signal associated with each substation, a switch for interconnecting said incoming line and said outgoing lines, means for operating said switch, an impulse transmitting device for transmitting impulses varying in order, number and duration, sources of signaling current of various characteristics, and mechanism responsive to said impulses for selecting the desired signaling current.

5. In a signaling system, a device for transmitting impulses of various characteristics, sources of current of various characteristics, a plurality of signals each responsive to current of a certain character, mechanism responsive to said impulse transmitting device for selecting current from the proper source to actuate a desired signal.

6. In a signaling system, a variably operable device for transmitting long and short impulses, a plurality of signals each responsive to current of a certain character, sources of current for actuating said signals, and means responsive to impulses from said impulse transmitting device for selecting the proper source of current for actuating the desired signal.

7. In a telephone system, an incoming line, outgoing lines, a plurality of substations connected to said outgoing lines, a signal associated with each of said substations, means for interconnecting said incoming line with any of said outgoing lines, a number indicating device for indicating the number of the desired line, sources of current of various characteristics for actuating said signals, a device for transmitting impulses of various characteristics, and means responsive to impulses from said impulse transmitting device for selecting the proper source of current and for operating the number indicating device to indicate the desired number.

8. In a signaling system, a plurality of signals arranged in groups, a group of three relays arranged to be selectively actuated in various combinations to select a group of signals, and a second group of relays arranged to be selectively operated to determine which signal of the selected group shall be operated.

9. In a signaling system, ten signals arranged in groups of two each, a group of three relays arranged to be selectively actuated in various combinations to select a group of signals, and two relays arranged to be selectively operated to determine which signal of the selected group shall be operated.

10. In a telephone system, an operator's position, a number indicating device thereat, lines terminating at said operator's position, a plurality of stations on each of said lines, sources of current of different characteristics, a signal at each of said stations responsive to current of a particular characteristic, and directively operable means at a distant point to transmit impulses of different characteristics for operating said number indicating device and for applying the proper current to a desired line to signal the wanted station thereon.

11. In a telephone system, an operator's position, a variable operable sender at said position for transmitting impulses of different characteristics, a second operator's position, party lines terminating thereat, means for interconnecting said positions, and a party line signaling mechanism and a number indicating device located at said last mentioned position, each being selectively responsive to impulses from said sender.

12. In a telephone system, an incoming line, outgoing party lines, means for interconnecting said incoming line with any of said outgoing lines, a number indicating device associated with said lines, registering mechanism for selectively controlling said indicating device, means for selectively signaling said party line, and means operable at a distant point for transmitting impulses of various characteristics to selectively operate said registering mechanism and said signaling means.

13. In a telephone system, an incoming line, outgoing party lines, means for interconnecting said incoming line with any of said outgoing party lines, a number indicating device associated with said outgoing lines, registering mechanism comprising a roup of relays for selectively controlling said indicating device, means for selectively signaling said party lines, and an impulse transmitting device for transmitting impulses of various characteristics to selectively operate said registering mechanism and said signaling means.

14. In a telephone system, an incoming line, outgoing party lines, means for interconnecting said incoming line with any of said outgoing party lines, a number indicating device associated with said outgoing lines, registering mechanism comprising groups of relays arranged to be selectively actuated in various combinations, means for selectively signaling said party lines, and an impulse transmitting device for transmitting impulses of various characteristics to selectively operate said registering mechanism and said signaling means.

15. In a telephone system, incoming lines, outgoing party lines, means for interconnecting any incoming line with any outgoing line, a device for indicating the number of certain of said lines, means for selectively signaling said party lines, and a sender for transmitting impulses of various characteristics to selectively actuate said number indicating device and said signaling means.

16. In a telephone system, an operator's position, a sender at said position for transmitting impulses of various characteristics, a second operator's position, party lines terminating thereat, means for interconnecting said positions, and means at said last mentioned operator's position for selectively signaling said party lines, said signaling means being responsive to impulses from said sender.

17. In a telephone system, an operator's position, a sender at said position for transmitting long and short impulses in various combinations, a second operator's position, party lines terminating thereat, means for interconnecting said positions, and means at said last mentioned operator's position for selectively signaling said party lines, said signaling means being responsive to impulses from said sender.

18. In combination, means for producing series of impulses of various characteristics, mechanism to be controlled, operating circuits for said mechanism, a multi-position switch of the sequence switch type, said switch controlling in its various positions certain of said operating circuits, and means responsive to a series of impulses for operating said switch.

In witness whereof, we hereunto subscribe our names this 29th day of March, A. D. 1917.

ALBEN E. LUNDELL
EDGAR H. CLARK.